United States Patent
VanderVelde

(10) Patent No.: US 6,471,171 B1
(45) Date of Patent: Oct. 29, 2002

(54) 2-PIECE LADDER RACK BRACKET

(75) Inventor: Charles VanderVelde, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/034,583

(22) Filed: Dec. 28, 2001

(51) Int. Cl.⁷ .............................................. E04E 3/00
(52) U.S. Cl. ........................... 248/229.12; 248/229.14; 256/65.03; 403/340
(58) Field of Search ...................... 248/229.12, 229.14, 248/229.22, 229.24, 201, 228.3, 230.3, 231.41, 211, 229.1, 226.11, 228.5, 295.11; 256/65.03; 403/340, 374.3

(56) References Cited

U.S. PATENT DOCUMENTS 4,678,151 A * 7/1987 Radeck .................. 248/223.41
5,560,576 A * 10/1996 Cargill ................. 248/228.5 X

OTHER PUBLICATIONS

ADC Telecommunications, Inc. FiberGuide® Fiber Management System catalog, p. 36, dated May 2000.
ADC Telecommunications, Inc. Supporting Overhead Systems brochure, date unknown.
Chatsworth Products, Inc. Cable Runway Support Products brochure, 2 pages, dated Mar. 16, 2000.
Homaco, Inc. Open & Closed Clips brochure, 1 page, dated May 30, 2000.
Newton Instrument Company, Inc. brochure, pp. 18–19, date unknown.
B–Line® Systems Inc. Cable Runway Accessories brochure, p. 116, date unknown.

* cited by examiner

Primary Examiner—Ramon O. Ramirez
(74) Attorney, Agent, or Firm—Robert A. McCann; Jay A. Saltzman; Christopher S. Clancy

(57) ABSTRACT

A bracket system for attachment to a rail is disclosed. The bracket system includes a first bracket having a front portion, a first side portion, a second side portion opposite the first side portion, and a top portion. Each of the first and second side portions of the first bracket have a notch for securing the first bracket to the rail. The bracket system also includes a second bracket having a front portion, a first side portion, a second side portion opposite the first side portion, and a top portion. Each of the first and second side portions of the second bracket have a notch for securing the second bracket to the rail. The first side portion of the first and second brackets each have at least one slot, and the second side portion of the first and second brackets each have a tab. The at least one slot of the first bracket is configured to receive the tab of the second bracket when the second bracket is inverted and attached to the first bracket.

14 Claims, 5 Drawing Sheets

2-PIECE LADDER RACK BRACKET

BACKGROUND OF THE INVENTION

The present invention is directed to a bracket system for attachment to a ladder rack rail, and more particularly, to a two-piece clamping bracket for a ladder rack, capable of attachment to ladder rack rails of various sizes.

Bracket systems attach components to existing hardware within a communications room area. Typically, the bracket system is attached to existing hardware, such as in-place cable racks, digital cable ways, existing threaded rods or equipment racks. Prior art bracket systems may include one bracket or two bracket assemblies. However, a one bracket assembly may be attached to only one size ladder rack rail. On the other hand, two bracket assemblies may be attached to ladder rack rails of various sizes, such as standard 1½ inch or 2 inch ladder rack rails. However, two bracket assemblies known in the art are not self-supporting on a ladder rack rail.

It would be desirable to provide a bracket system for attachment to ladder rack rails of various sizes, such as standard 1½ inch and 2 inch ladder rack rails.

It would also be desirable to provide a bracket system that is self-supporting upon a ladder rack, after the second bracket is attached to the first bracket, to allow easy insertion of a threaded rod through clearance holes on each bracket's top surface.

SUMMARY OF THE INVENTION

The invention includes a bracket system for attachment to a rail. In at least one form, the bracket system comprises a first bracket having a front portion, a first side portion, a second side portion opposite the first side portion, and a top portion, and a second bracket having a front portion, a first side portion, a second side portion opposite the first side portion, and a top portion. Each of the first and second side portions of the first and second brackets, respectively, have a notch for securing the first and second brackets, respectively, to the rail. The first side portion of the first and second brackets each have at least one slot, and the second side portion of the first and second bracket each have a tab. The at least one slot of the first bracket is configured to receive the tab of the second bracket when the second bracket is inverted and attached to the first bracket.

Preferably, the height of the front portion of the first and second brackets is less than the height of either the first or second side portions of the first and second brackets.

Preferably, the first side portion of the first and second brackets includes a first slot and a second slot.

Preferably, the tab of the second bracket mates with either the first or second slot of the first bracket when the second bracket is inverted and attached to the first bracket. Further, the tab of the first bracket mates with either the first or second slot of the second bracket when the second bracket is inverted and attached to the first bracket.

Preferably, the top portion of the first and second brackets includes an aperture proximate the first side portion of the first and second brackets, respectively.

Preferably, the bracket system also includes a securing means for securing the bracket system to the rail. The securing means comprises a threaded rod having a first end and a second end, and the rod is insertable through the aperture in the top portion of the first and second brackets, respectively. The bracket system further includes a first nut and a first washer attached to the first end of the rod, and a second nut and a second washer attached to the second end of the rod.

The invention includes a method for attaching a bracket system to a rail. In at least one form, the method comprises the steps of providing a first bracket having a front portion, a first side portion, a second side portion opposite the first side portion, and a top portion, wherein the first and second side portions of the first bracket have a notch for securing the first bracket to the rail, providing a second bracket having a front portion, a first side portion, a second side portion opposite the first side portion, and a top portion, wherein the first and second side portions of the second bracket have a notch for securing the second bracket to the rail, providing the first side portion of the first and second brackets with at least one slot, and the second side portion of the first and second brackets with a tab, attaching the first bracket to one side of the rail, inverting the second bracket, attaching the second bracket to the other side of the rail, with the first side portion of the second bracket between the first and second side portions of the first bracket, and attaching the second bracket to the first bracket.

Preferably, the method further comprises the steps of inserting a threaded rod having a first end and a second end through an aperture in the top portion of the first and second brackets, and attaching a securing means to the first end and the second end of the rod to secure the bracket assembly to the rail.

DETAILED DESCRIPTION OF PREFERRED EMBODIMENTS

The illustrated embodiment of the invention is directed to a two-piece bracket system for attachment to ladder rack rails of various sizes. The bracket system is self-supporting upon the ladder rack rail after the second bracket is attached to the first bracket, to allow easy insertion of a threaded rod through the aperture in the first and second brackets.

Figure 1:
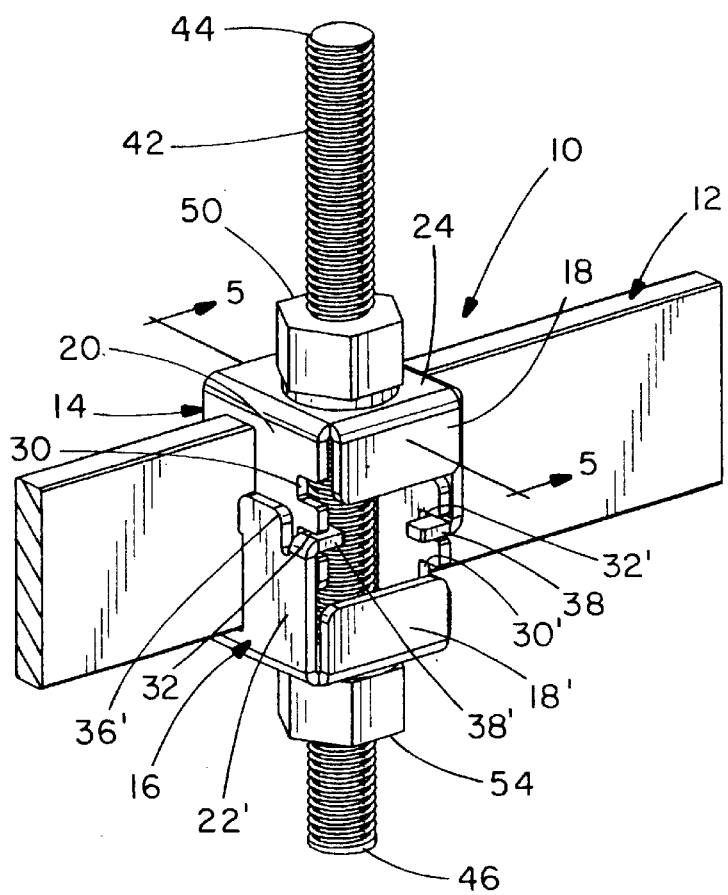
FIG. 1 shows a completely assembled bracket system in accordance with a preferred embodiment of the invention.
Figure 2:
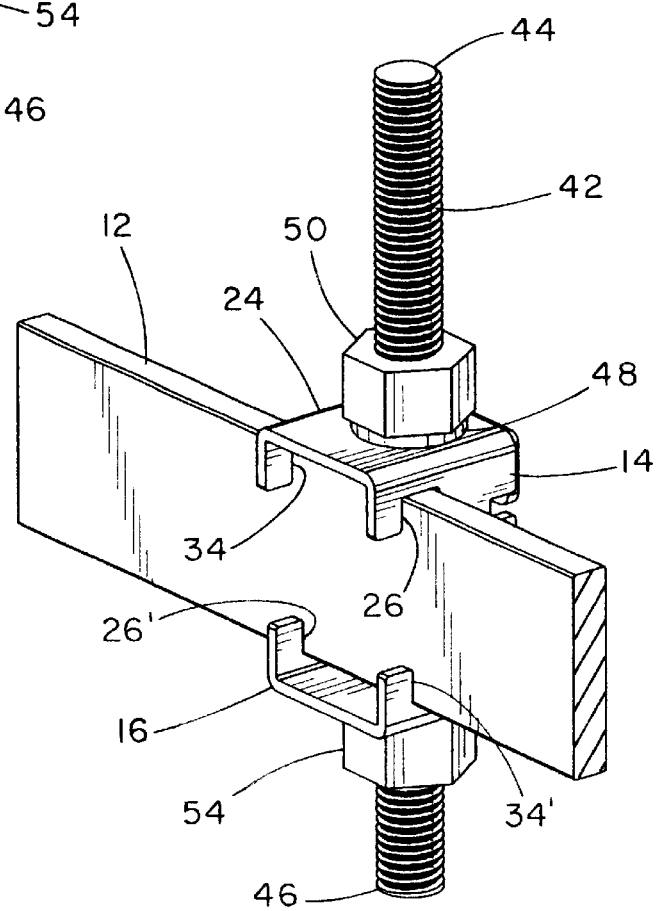
FIG. 2 shows a rear perspective view of the bracket system of FIG. 1.
Figure 3:
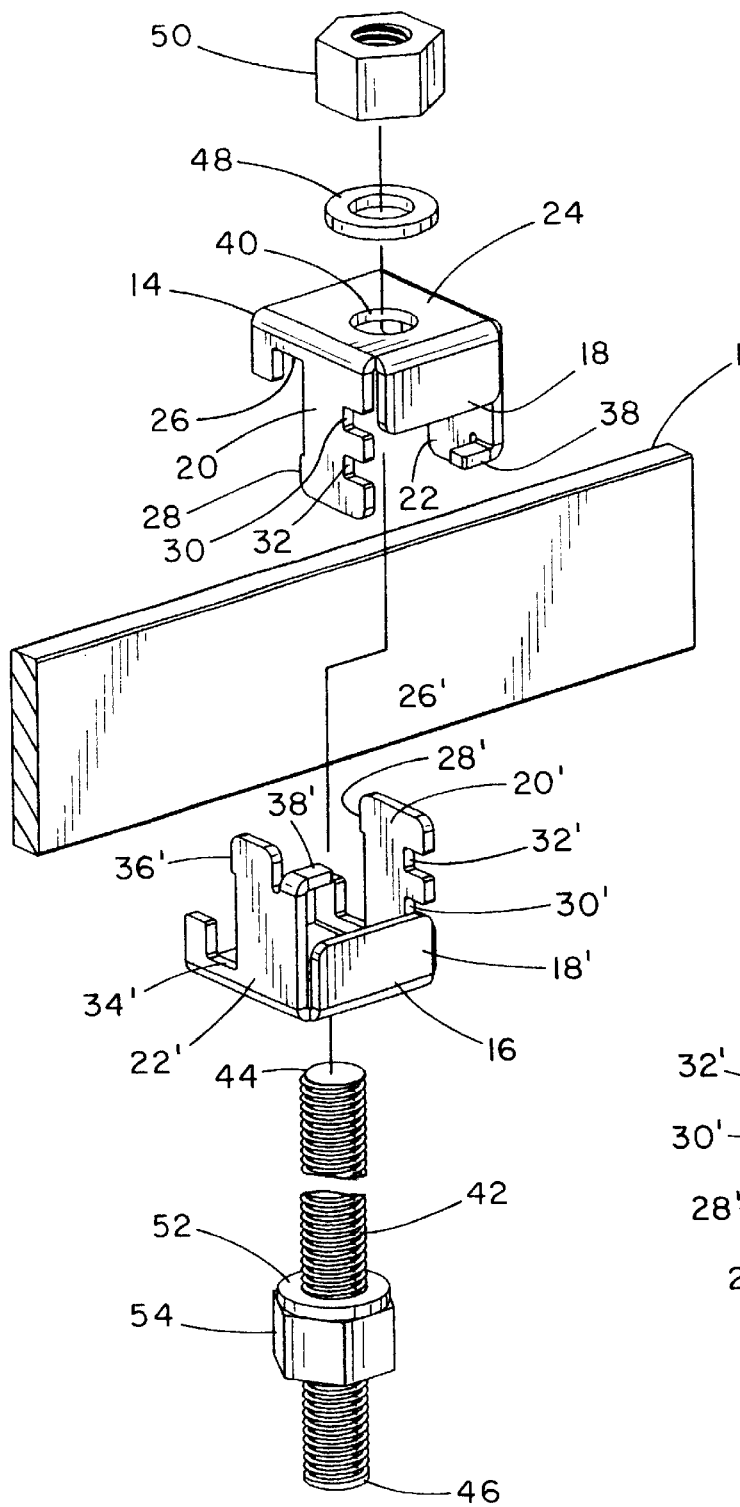
FIG. 3 shows an exploded view of the bracket system of FIG. 1.

FIG. 1 shows a completely assembled bracket system 10 attached to a rail 12. FIG. 2 shows a rear view of the same, and FIG. 3 shows an exploded view of the same. As can be seen therein, in a preferred embodiment, the bracket system 10 includes a first bracket 14 and a second bracket 16. The first bracket 14 and the second bracket 16, after being inverted, are attached to the rail 12 to form the bracket system 10.

As best seen in exploded FIG. 3, first bracket 14 includes a front portion 18, a first side portion 20, a second side portion 22 opposite the first side portion 20, and a top portion 24. Preferably, the height of the front portion 18 is less than the height of either the first side portion 20 or the second side portion 22.

Figure 4:
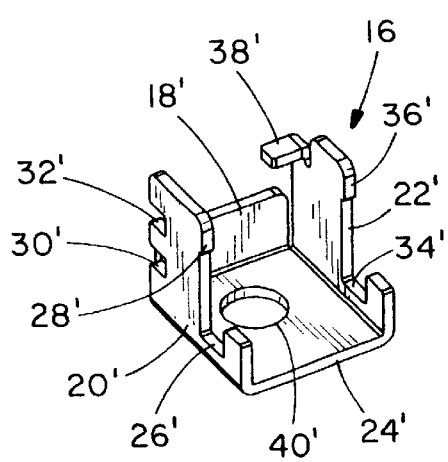
FIG. 4 shows a rear perspective view of the bottom bracket of FIG. 1.
Figure 5:
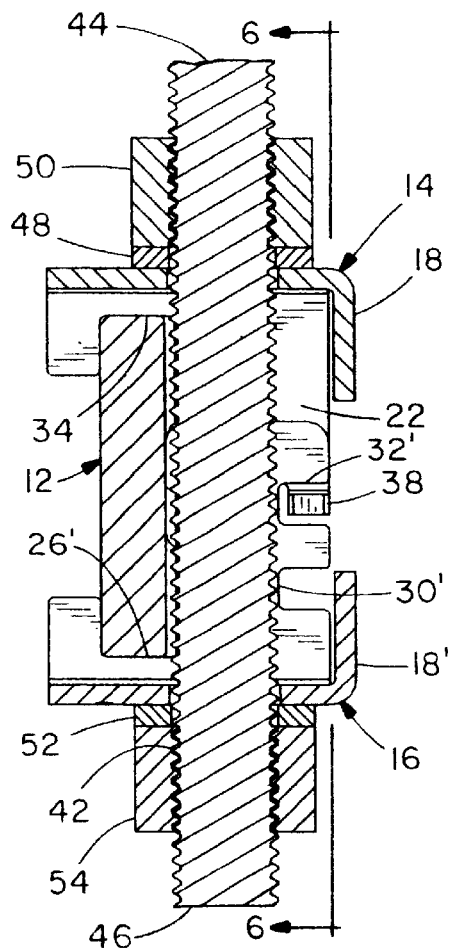
FIG. 5 shows a cross-sectional view of the bracket system of FIG. 1, taken along the line 5—5 in FIG. 1 and looking in the direction of the arrows.

As can be seen in FIG. 4, the second bracket 16 is identical to the first bracket 14. Accordingly, components of the second bracket 16 are numbered the same as components of the first bracket 14, differentiated by a prime (') notation. The second bracket 16 includes front portion 18', first side portion 20', second side portion 22' opposite the first side portion 20', and a top portion 24'.

Figure 7:
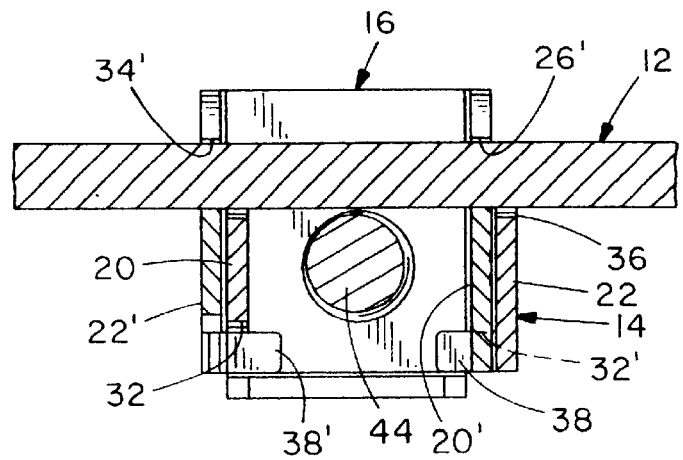
FIG. 7 shows a cross-sectional view of the bracket system of FIG. 1, taken along the line 7—7 in FIG. 6 and looking in the direction of the arrows.
Figure 8:
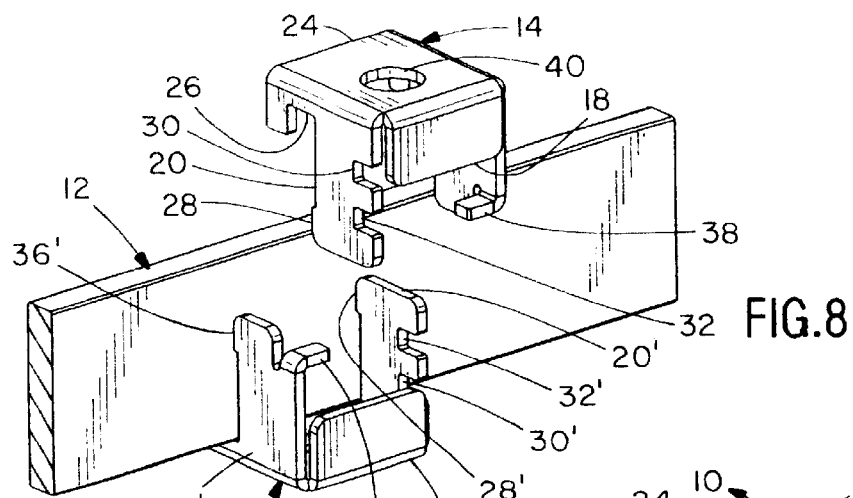
FIG. 8 shows a perspective view of the top and bottom brackets of FIG. 1, during attachment to the rail.

As shown in FIG. 8, the first side portion 20 includes a notch 26, a flange 28, a first slot 30, and a second slot 32. The notch 26 allows the first bracket 14 to be positioned over the rail 12. Similarly, as shown in cross-section in FIG. 7, the second side portion 22 of the first bracket 14 includes a notch 34, a flange 36, and a tab 38. The notch 34 allows the first bracket 14 to be positioned over the rail 12. Flanges 28, 28', 36, and 36' provide surface contact points adjacent to the rail 12. By providing these four contact points with the rail 12, the present invention accommodates manufacturing irregularities in the rail 12. For example, the rail 12 may not be flush with the notches 26, 26', 34, and 34'.

Figure 12:
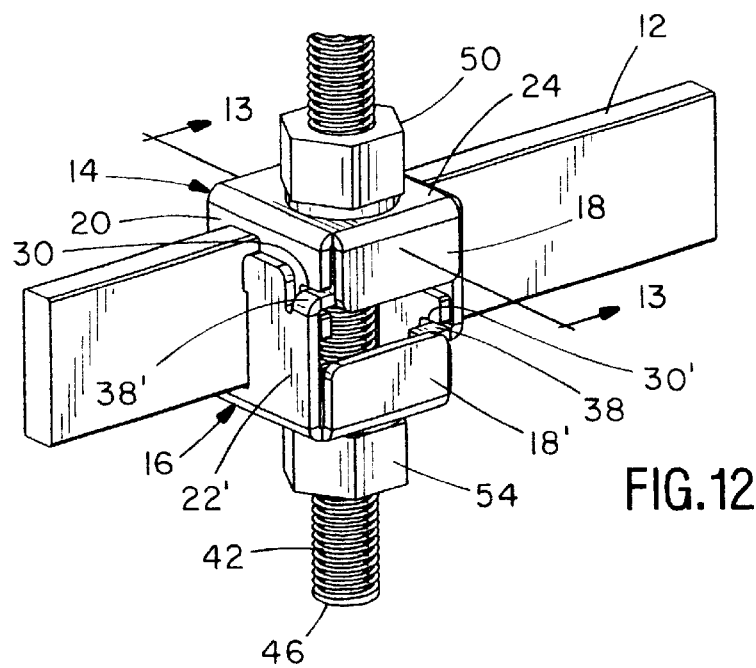
FIG. 12 shows a completely assembled bracket system in accordance with another preferred embodiment of the invention.
Figure 13:
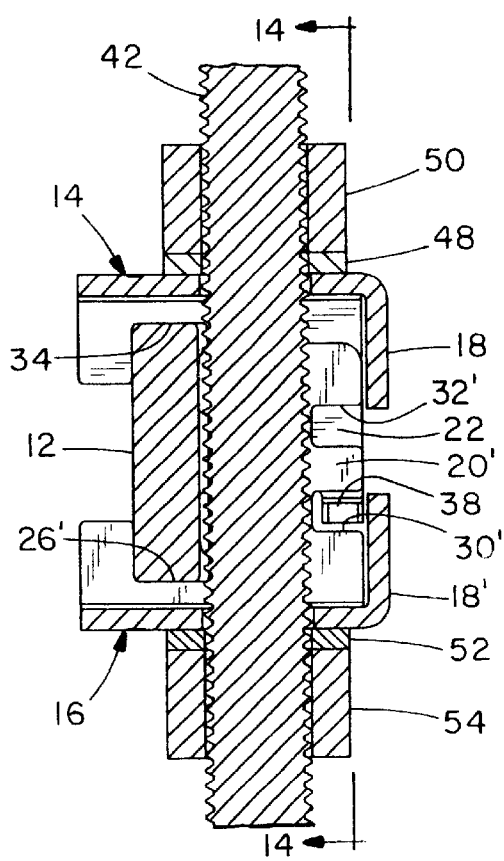
FIG. 13 shows a cross-sectional view of the bracket system of FIG. 12, taken along the line 13—13 of FIG. 12 and looking in the direction of the arrows.
Figure 14:
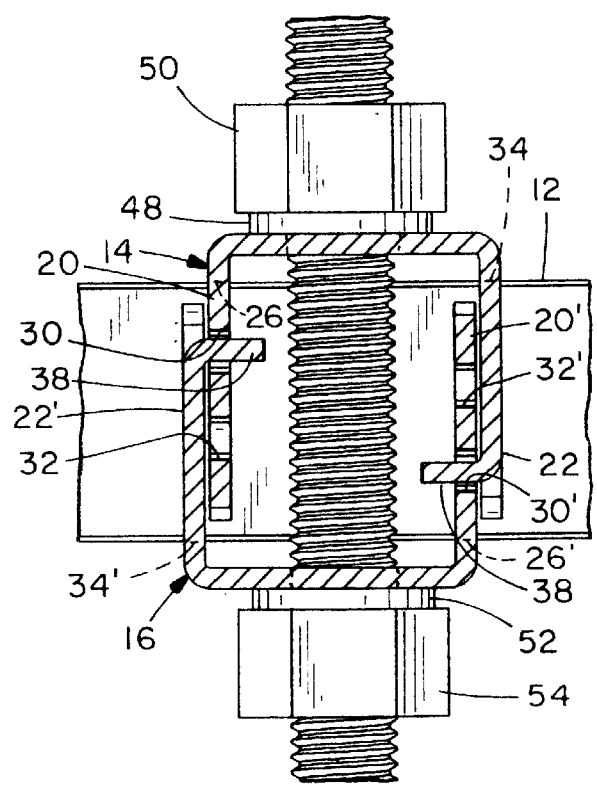
FIG. 14 shows a cross-sectional view of the bracket system of FIG. 12, taken along the line 14—14 of FIG. 13 and looking in the direction of the arrows.

The first slots, 30 and 30', and the second slots, 32 and 32', allow the bracket assembly 10 to be attached to either a standard 1½ inch ladder rail or a standard 2 inch ladder rail. As shown in perspective in FIG. 1 and in cross-section in FIG. 6, when attached to a 2 inch ladder rail, the tab 38' of the second bracket 16 mates with the second slot 32 of the first bracket 14. Moreover, the tab 38 of the first bracket 14 mates with the second slot 32' of the second bracket 16. As shown in perspective in FIG. 12 and in cross-section in FIG. 14, when attached to a 1½ inch ladder rail, the tab 38' of the second bracket 16 mates with the first slot 30 of the first bracket 14. Moreover, the tab 38 of the first bracket 14 mates with the first slot 30' of the second bracket 16. Preferably, the tabs 38 and 38' loosely mate with slots 30, 30', 32 and 32', to accommodate any manufacturing defects or slight misalignments between the first bracket 14 and the second bracket 16.

Figure 6:
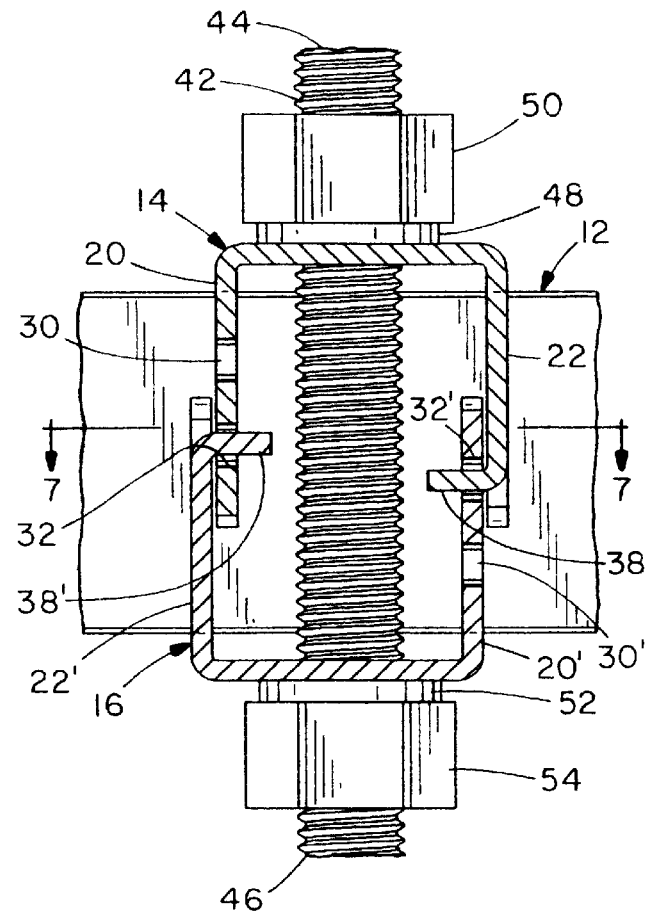
FIG. 6 shows a cross-sectional view of the bracket system of FIG. 1, taken along the line 6—6 in FIG. 5 and looking in the direction of the arrows.
Figure 11:
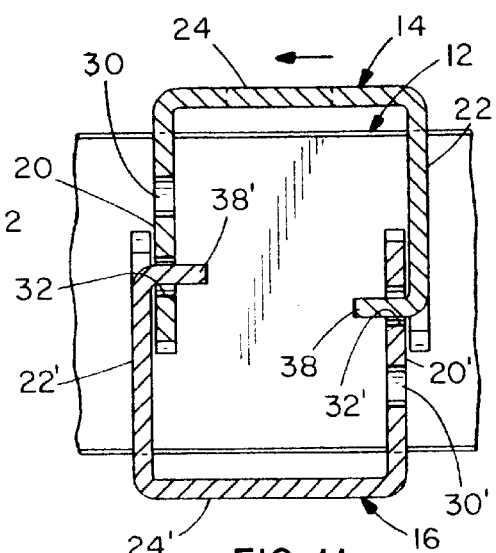
FIG. 11 shows a cross-sectional view of the top and bottom brackets of FIG. 1, after the bottom bracket has been secured to the top bracket.

As shown in perspective in FIG. 2 and in cross-section in FIGS. 6 and 11, after attachment of the first bracket 14 and the second bracket 16 to the rail 12, the first bracket 14 is vertically offset with respect to the second bracket 16. Top portions, 24 and 24', include apertures, 40 and 40', respectively. As shown in FIGS. 3 and 4, apertures, 40 and 40', are closer to first side portions, 20 and 20', than to second side portions, 22 and 22'. This offset center design of the top portions, 24 and 24', allows rod 42 to be inserted through apertures, 40 and 40', for securing the bracket system 10 to the rail 12.

As shown in perspective in FIG. 1, the rod 42 has a first end 44 and a second end 46. As best seen in cross-section in FIG. 6, a first washer 48 and a first nut 50 are attached to the first end 44 of the rod 42 to secure the bracket system 10 to the rail 12. Likewise, a second washer 52 and a second nut 54 are attached to the second end 46 of the rod 42 to further secure the bracket system 10 to the rail 12.

Figure 9:
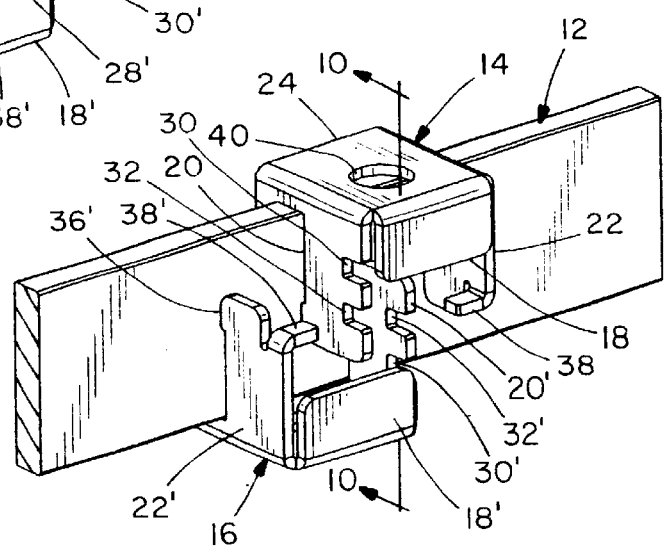
FIG. 9 shows a perspective view of the top and bottom brackets of FIG. 1, after attachment to the rail.
Figure 10:
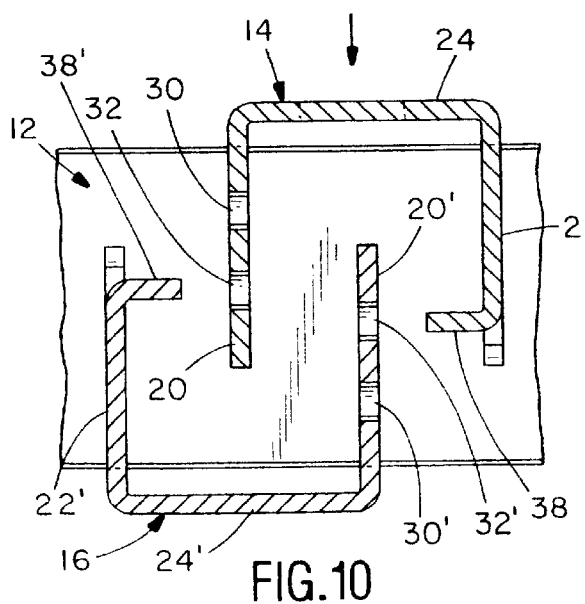
FIG. 10 shows a cross-sectional view of the top and bottom brackets of FIG. 1, taken along the line 10—10 in FIG. 9 and looking in the direction of the arrows.

In operation, the first bracket 14 is positioned on one side of the rail 12. The second bracket 16 is inverted, and the first side portion 20' of the second bracket 16 is placed between the first side portion 20 and the second side portion 22 of the first bracket 14 (see FIGS. 9 and 10). When attached to a 1½ inch ladder rail, the tab 38' of the second bracket 16 mates with the first slot 30 of the first bracket 14, and the tab 38 of the first bracket 14 mates with the first slot 30' of the second bracket 16. Similarly, when attached to a 2 inch ladder rail, the tab 38' of the second bracket 16 mates with the second slot 32 of the first bracket 14, and the tab 38 of the first bracket 14 mates with the second slot 32' of the second bracket 16. When the second bracket 16 is attached to the first bracket 14, the first and second brackets, 14 and 16, can be released without falling from the rail 12. This allows for easy insertion of the rod 42 through apertures, 40 and 40'. Then the first washer 48 and the first nut 50 are attached to the first end 44 of the rod 42, and the second washer 52 and the second nut 54 are attached to the second end 46 of the rod 42.

The disclosed invention provides a bracket system for attachment to ladder rack rails of various sizes. It should be noted that the above-described and illustrated embodiments and preferred embodiments of the invention are not an exhaustive listing of the forms such a bracket system in accordance with the invention might take; rather, they serve as exemplary and illustrative of embodiments of the invention as presently understood. By way of example, and without limitation, a bracket system having three of more slots to accommodate additional ladder rack rail sizes is contemplated to be within the scope of the invention. Many other forms of the invention are believed to exist.

What is claimed is:

1. A bracket system for attachment to a rail, the system comprising:
   a first bracket having a front portion, a first side portion, a second side portion opposite the first side portion, and a top portion,
   wherein the first and second side portions of the first bracket have a notch for securing the first bracket to the rail;
   a second bracket having a front portion, a first side portion, a second side portion opposite the first side portion, and a top portion,
   wherein the first and second side portions of the second bracket have a notch for securing the second bracket to the rail;
   the first side portion of the first and second brackets having at least one slot; and
   the second side portion of the first and second brackets having a tab,
   wherein the at least one slot of the first bracket being configured to receive the tab of the second bracket when the second bracket is inverted and attached to the first bracket.

2. The bracket system of claim 1 wherein the front portion of the first and second brackets has a height and the first side portion of the first and second brackets has a height, wherein the height of the front portion is less than the height of the first side portion.

3. The bracket system of claim 1 wherein the first side portion of the first and second brackets includes a first slot and a second slot.

4. The bracket system of claim 3 wherein the tab of the second bracket mates with the first slot of the first bracket when the second bracket is inverted and attached to the first bracket.

5. The bracket system of claim 3 wherein the tab of the second bracket mates with the second slot of the first bracket when the second bracket is inverted and attached to the first bracket.

6. The bracket system of claim 3 wherein the tab of the first bracket mates with the first slot of the second bracket when the second bracket is inverted and attached to the first bracket.

7. The bracket system of claim 3 wherein the tab of the first bracket mates with the second slot of the second bracket when the second bracket is inverted and attached to the second bracket.

8. The bracket system of claim 1 wherein the top portion of the first and second brackets includes an aperture proximate the first side portion of the first and second brackets, respectively.

9. The bracket system of claim 8 further including a securing means for securing the bracket system to the rail.

10. The bracket system of claim 9 wherein the securing means comprises a threaded rod having a first end and a second end, the rod being insertable through the aperture in the top portion of the first and second brackets, respectively.

11. The bracket system of claim 10 further including a first nut and a first washer attached to the first end of the rod, and a second nut and a second washer attached to the second end of the rod.

12. The bracket system of claim 1 wherein the top portion of the first and second brackets includes an aperture proximate the second side portion of the first and second brackets, respectively.

13. A method for attaching a bracket system to a rail, the method comprising the steps of:

providing a first bracket having a front portion, a first side portion, a second side portion opposite the first side portion, and a top portion, wherein the first and second side portions of the first bracket have a notch for securing the first bracket to the rail;

providing a second bracket having a front portion, a first side portion, a second side portion opposite the first side portion, and a top portion, wherein the first and second side portions of the second bracket have a notch for securing the second bracket to the rail;

providing the first side portion of the first and second brackets with at least one slot, and the second side portion of the first and second brackets with a tab;

attaching the first bracket to one side of the rail;

inverting the second bracket;

attaching the second bracket to the other side of the rail, with the first side portion of the second bracket between the first and second side portions of the first bracket; and attaching the second bracket to the first bracket.

14. The method of claim 13 further comprising the steps of:

inserting a threaded rod having a first end and a second end through an aperture in the top portion of the first and second brackets; and attaching a securing means to the first end and the second end of the rod to secure the bracket assembly to the rail.

* * * * *